United States Patent [19]
Dye et al.

[11] 4,194,464
[45] Mar. 25, 1980

[54] RECORD CARE PAD

[75] Inventors: John F. Dye, Muncie, Ind.; Virgil F. Friebel, Longmont, Colo.

[73] Assignee: Ball Corporation, Muncie, Ind.

[21] Appl. No.: 866,352

[22] Filed: Jan. 3, 1978

[51] Int. Cl.² .............................................. B05C 13/02
[52] U.S. Cl. ...................... 118/501; 15/268; 274/47
[58] Field of Search .................. 118/501, 73, 500; 15/268; 134/201, 182, 183; 274/47, 39 R; 206/309

[56] References Cited

U.S. PATENT DOCUMENTS

| | | | |
|---|---|---|---|
| 1,102,073 | 6/1914 | Pearson | 274/47 |
| 1,247,232 | 11/1917 | Delany | 274/47 |
| 1,347,113 | 7/1920 | Merriam | 274/39 |
| 2,577,035 | 12/1951 | Reed | 274/39 R |
| 3,792,507 | 2/1974 | Szabrak et al. | 15/268 |

*Primary Examiner*—John P. McIntosh
*Attorney, Agent, or Firm*—Gilbert E. Alberding

[57] ABSTRACT

A stationary pad is disclosed for supporting, holding and protecting a record during treatment. The periphery of the pad is provided with a continuous raised lip, so as to prevent the inadvertent spillage of liquids from the pad onto an underlying surface or the like. Pedestal portions are distributed over most but not all of the area of the pad to raise the record above the surface of the pad so that the lower side of the record does not rest in the fluid which may flow off of the record during treatment. The pad is preferably made of a rubber-like, non-abrasive material having a high coefficient of friction and relatively low electrical conductivity. In one embodiment of the present invention, a central protrusion in the pad is provided on which the record is centered. In a second embodiment, the peripheral lip extends to a height greater than the height of the pedestal portions so as to prevent the record from sliding off the pad.

41 Claims, 2 Drawing Figures

RECORD CARE PAD

This invention relates to apparatus for supporting, holding and protecting a record and its surrounding environment during treatment such as cleaning or application of a protective coating to lubricate or seal the record. In particular, the invention relates to a device in the presently preferred form of a stationary pad having outer dimensions larger than that of the phonograph record which is to be treated.

When treating a record, it should be placed on a clean, lint-free surface. Various methods are presently used, such as placing the record on a towel or on a couch cushion, etc. In most of these methods, the record may bend, pick up additional dirt or slide about.

U.S. Pat. No. 1,102,073 to Pearson, discloses a stationary cleaning structure. Treatment of the record occurs at the interface between the record and the stationary structure, and the stationary cleaning structure is of lesser diameter than the record itself. Furthermore, no provision is made for the collection of fluids which may flow from the record or device during treatment.

U.S. Pat. No. 3,558,123 to Candella, teaches a structure which sits on the usual turntable and rotates therewith. The structure contains a raised central portion and a continuous outer lip extending beyond the periphery of the record so as to contain fluids used in treatment of the record within a pan-shaped device. The fact that the turntable is used as a support is undesirable in that treatment of the record exposes the turntable to unnecessary chances of damage.

In addition, there are a great number of references related to turntable structures for phonographs. However, all of the references appear to have some deficiency for use as a treatment surface. U.S. Pat. No. 1,347,113 to Merriam, does appear to have a lip surrounding the figure; however, as illustrated in FIG. 4, the whole structure is perforated so that the lip could not be used to contain a treatment fluid. U.S. Pat. No. 2,577,035 to Reid and No. 3,524,652 to Van Antwerp, also illustrate turntable structures; however, neither patent shows an outer lip, nor do the structures seem to be necessarily larger than the record which is to be played thereon.

Finally, U.S. Pat. Nos. 1,247,232 to Delany and 3,792,507 to Szabrak et al both disclose structures for cleaning records or computer disks. However, the structure disclosed in both is quite different from the present invention.

The present invention overcomes many of the problems of the prior art. When placed on a flat, firm surface, the device provides a safe, secure means for holding a record during treatment. The device consists of a somewhat flexible stationary pad having outer dimensions larger than the phonograph record which is to be treated on it. The periphery of the pad is provided with a continuous raised lip so as to prevent the inadvertent spillage of treatment liquids from the pad onto the underlying surface or the like. Pedestal portions are distributed over most of the area with undercut channels therebetween in order to aid the removal of the record (e.g. finger gripping and air passage areas are defined) and to prevent the lower surface of the record from lying in the treatment fluids that may flow off of the upper surface of the record or be inadvertently misapplied beyond the record edges. The pad is preferably made of a rubber-like, nonabrasive material which has a high coefficient of friction for prohibiting the record from rotating or sliding about so that an operator need not hold the record in place during treatment. This material is also preferably of a low electrical conductivity so as to retain static electricity charges which tend to attract and retain dirt particles from the record surface placed in contact therewith.

In one embodiment of the invention, a central protrusion is provided on which to center the record. In a second embodiment of the invention, the peripheral lip extends in height above the level of the pedestal portions so as to provide a further safeguard that the record will not slide off of the pad.

These and other objects and advantages of the invention will become more apparent and more readily appreciated from the following detailed description of the presently preferred exemplary embodiment of this invention taken in conjunction with the accompanying drawings of which:

Figure 1:
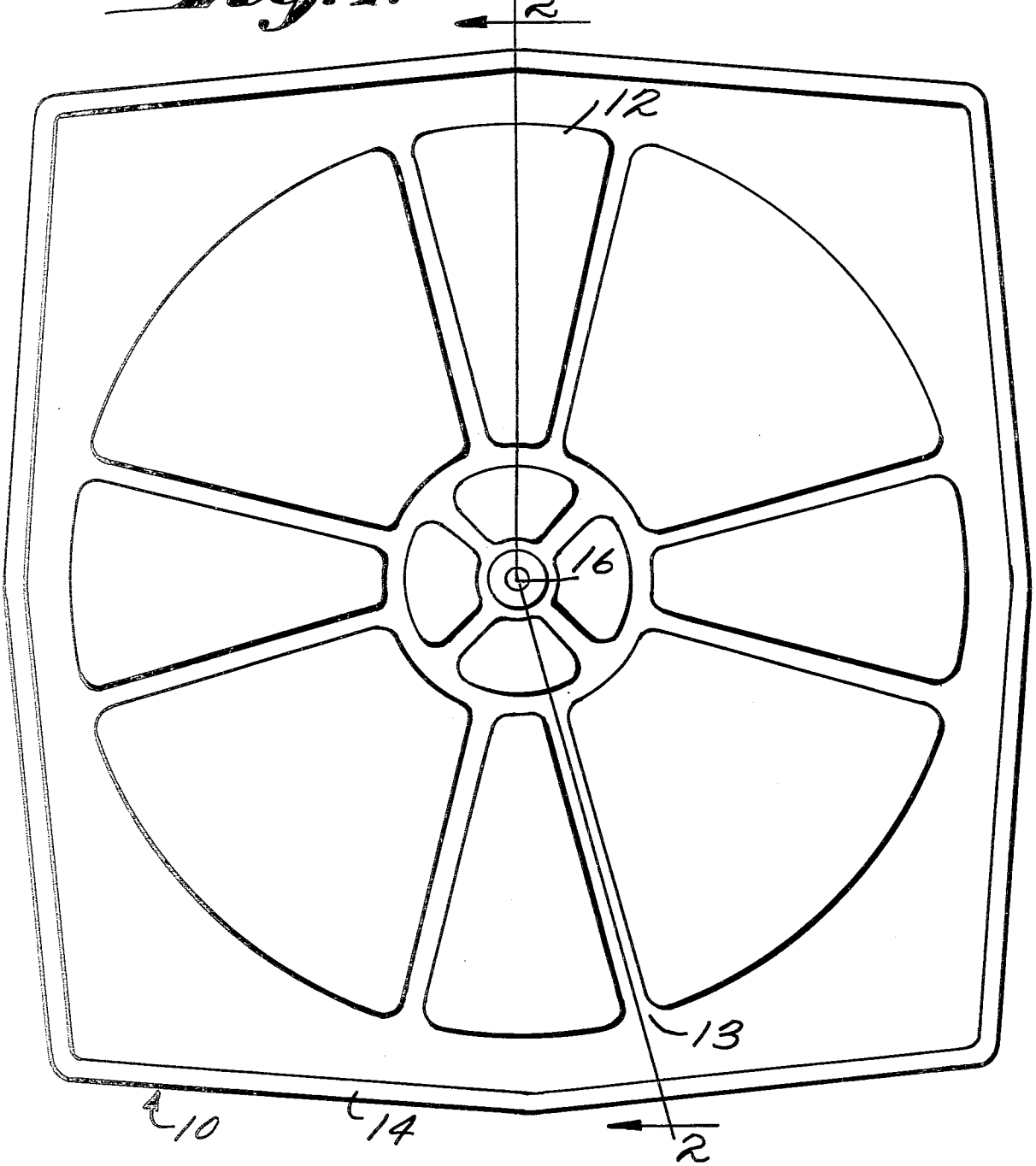
FIG. 1 is a top plan view of the present invention.
Figure 2:
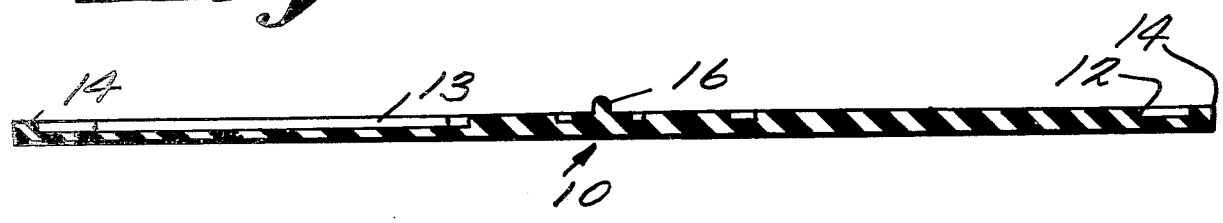
FIG. 2 is a sectional elevation taken along the 2—2 line of FIG. 1.

Referring now to the drawings, pad 10 has outer dimensions somewhat larger than the largest record which will be treated on pad 10 (typically a standard long-playing record). Raised pedestal portions, such as portion 12, has a diameter somewhat smaller than that of a long-playing record and projects approximately 0.05 inches above the surface of pad 10. Pedestal portions 12 are separated by channels 13 having the same elevation as the upper surface of pad 10. Pedestal portions 12 serve to raise the record above any fluid that may accumulate on pad 10 during treatment and to aid in the removal of the record after treatment. The surface of pedestal portions 12 is roughened so that the surface varies by approximately two to three thousandths of an inch in depth to increase the friction between pedestal portions 12 and the record. The roughening is preferably accomplished so as to give the appearance of leather.

The periphery of pad 10 is provided with a continuous raised lip 14 so as to prevent the inadvertent spillage of fluids from the pad onto an underlying surface or the like. The height of lip 14 is slightly lower than the height of pedestal portions 12 so as to protect the underside of the record being treated from an excess accumulation of treatment fluid.

At the center of pad 10 is small protrusion 16 designed to fit into the standard locating hole in a long-playing record. In use, the record is centered on protrusion 16 so as to prohibit sliding. The roughened surface of pedestal portions 12, in addition to preventing sliding, also prevents rotation.

In the preferred embodiment, pad 10 and the features thereon are all constructed of the same material. This material is preferably rubber-like and nonabrasive, with a high coefficient of friction. Preferably, pad 10 is composed of a thermoplastic rubber. In the preferred embodiment, pad 10 is composed of a butadiene-styrene copolymer such as Solprene manufactured by Phillips. This substance not only increases the friction between pedestal portions 12 and the record, but also increases the friction between pad 10 and the stationary surface on which it is placed, thereby increasing the stability of the record.

The butadiene-styrene copolymer is of relatively low electrical conductivity and thus has a tendency to develop and retain a static charge on its surface while the record is being rubbed during treatment. This static charge has been discovered to be useful in attracting and retaining foreign particles, such as lint, dust, etc., from the lower surface of the record.

In an alternative embodiment of the present invention, lip 14 is constructed so as to extend slightly above pedestal portions 12, and protrusion 16 is eliminated. In this embodiment, lip 14 prohibits the record from sliding off of pad 10.

Although only two exemplary embodiments of this invention have been described in detail above, those skilled in the art will readily appreciate that many modifications are possible in the exemplary embodiments without materially departing from the novel teachings and advantages of this invention. For example, if it is known that all treatments performed on the pad will not involve excess fluids, lip 14 need not be continuous around the periphery of pad 10. Accordingly, all such modifications are intended to be included within the scope of the invention as defined in the following claims.

What is claimed is:

1. Apparatus for positioning a phonograph record at a stationary location during treatment with a fluid without damaging said record, said apparatus comprising:
   a base pad having dimensions larger than the dimensions of the largest record to be held stationary at said location, said pad being composed of a nonabrasive material;
   friction means for preventing said record from sliding or rotating during said treatment; and
   support means for preventing the lower surface of said record from resting in said fluid that may flow off of said record during said treatment, said support means including a plurality of raised coplanar pedestal portions attached to said pad, distributing over substantially the entire area of said pad covered by said record during said treatment, said portions being separated from each other so as to form interconnected channels therebetween.

2. Apparatus as in claim 1 wherein said base pad is composed of a thermoplastic rubber.

3. Apparatus as in claim 2 wherein said thermoplastic rubber is a butadiene-styrene copolymer.

4. Apparatus as in claim 1 wherein said friction means comprise said raised pedestal portions, said portions having a roughened surface with a high coefficient of friction.

5. Apparatus as in claim 1 further comprising retaining means for preventing said record from sliding off of said pad.

6. Apparatus as in claim 5 wherein said retaining means comprises a raised lip around at least a portion of the periphery of said pad of a height at least the height of said friction means.

7. Apparatus for positioning a phonograph record at a stationary location during treatment with a fluid without damaging said record, said apparatus comprising:
   a base pad having dimensions larger than the dimensions of the largest record to be held stationary at said location, said pad being composed of a nonabrasive material;
   friction means for preventing said record from sliding or rotating during said treatment; and
   support means for preventing the lower surface of said record from resting in said fluid that may flow off of said record during said treatment, said support means including a plurality of raised coplanar pedestal portions attached to said pad, distributed over substantially the entire area of said pad covered by said record during said treatment, said portions being separated from each other so as to form interconnected channels therebetween, including at least one annular channel.

8. Apparatus for positioning a phonograph record at a stationary location during treatment with a fluid without damaging said record, said apparatus comprising:
   a base pad having dimensions larger than the dimensions of the largest record to be held stationary at said location, said pad being composed of a nonconductive, nonabrasive material so that any static electrical charge developing on said pad will be retained to attract foreign particles from the surface of said record;
   friction means for preventing said record from sliding or rotating during said treatment; and
   support means for preventing the lower surface of said record from resting in said fluid that may flow off of said record during said treatment, said support means including a plurality of raised coplanar pedestal portions attached to said pad, distributed over substantially the entire area of said pad covered by said record during said treatment, said portions being separated from each other so as to form interconnected channels therebetween, including at least one radial channel.

9. Apparatus for positioning a phonograph record at a stationary location during treatment with a fluid without damaging said record, said apparatus comprising:
   a base pad having dimensions larger than the dimensions of the largest record to be held stationary at said location, said pad being composed of a nonabrasive material;
   friction means for preventing said record from sliding or rotating during said treatment;
   means for engaging the centering hole of said record for preventing said record from sliding on said pad during said treatment; and
   support means for preventing the lower surface of said record from resting in said fluid that may flow off of said record during said treatment, said support means including a plurality of raised coplanar pedestal portions attached to said pad, distributed over substantially the entire area of said pad covered by said record during said treatment, said portions being separated from each other so as to form interconnected channels therebetween, including at least one radial channel and at least one annular channel.

10. Apparatus as in claim 9 wherein said means for engaging comprises a central protrusion composed of the same material of which said pad is composed.

11. Apparatus for positioning a phonograph record at a stationary location during treatment with a fluid without damaging said record and without contaminating the area surrounding said stationary location with said fluid, said apparatus comprising:
    a base pad having dimensions larger than the dimensions of the largest record to be held at said stationary location, said pad being composed of a nonabrasive material;
    friction means for preventing said record from sliding or rotating on said pad during said treatment; and
    support means for preventing the lower surface of said record from resting in said fluid that may flow off of said record during said treatment, said support means including a plurality of raised coplanar pedestal portions attached to said pad, distributed over substantially the entire area of said pad covered by said record during said treatment, said portions being separated from each other so as to form interconnected channels therebetween.

12. Apparatus for positioning a phonograph record at a stationary location during treatment with a fluid without damaging said record and without contaminating the area surrounding said stationary location with said fluid, said apparatus comprising:
a base pad having dimensions larger than the dimensions of the largest record to be held at said stationary location, said pad being composed of a nonconductive, nonabrasive material so that static electrical charge developing on said pad will be retained to attract and retain foreign objects from the surface of said record;
friction means for preventing said record from sliding or rotating on said pad during said treatment; and
support means for preventing the lower surface of said record from resting in said fluid that may flow off of said record during said treatment, said support means including a plurality of raised coplanar pedestal portions attached to said pad, distributed over substantially the entire area of said pad covered by said record during said treatment, said portions being separated from each other so as to form interconnected channels therebetween.

13. Apparatus for positioning a phonograph record at a stationary location during treatment with a fluid without damaging said record and without contaminating the area surrounding said stationary location with said fluid, said apparatus comprising:
a base pad having dimensions larger than the dimensions of the largest record to be held stationary, said pad being made of a nonabrasive material having a roughened, textured surface;
containing means for preventing said fluid used in said treatment from flowing off of said pad; and
support means for preventing the lower surface of said record from resting in said fluid that may flow off of said record during said treatment, said support means including a plurality of raised coplanar pedestal portions attached to said pad, distributed over substantially the entire area of said pad covered by said record during said treatment, said portions being separated from each other so as to form interconnected channels therebetween.

14. Apparatus as in claim 13 wherein said containing means comprises a continuously raised lip around the periphery of said pad of a height less than the height of said support means.

15. Apparatus as in claim 13 further comprising retaining means for preventing said record from sliding off of said pad.

16. Apparatus as in claim 15 wherein said retaining means and said containing means comprise a continuous raised lip around the periphery of said pad of a height at least the height of said support means.

17. Apparatus as in claim 13 wherein said raised pedestal portions are composed of a thermoplastic rubber with a roughened upper surface.

18. Apparatus as in claim 17 wherein said thermoplastic rubber is a butadiene-styrene copolymer.

19. Apparatus as in claim 13 wherein said roughened surface varies in depth on the order of three thousandths of an inch.

20. Apparatus for positioning a phonograph record at a stationary location during treatment with a fluid without damaging said record and without contaminating the area surrounding said stationary location with said fluid, said apparatus comprising:
a base pad having dimensions larger than the dimensions of the largest record to be held at said stationary location, said pad being made of a nonabrasive material having a surface with a high coefficient of friction;
means for preventing said fluid used in said treatment from flowing off of said pad; and
support means for preventing the lower surface of said record from resting in said fluid that may flow off of said record during said treatment, said support means including a plurality of raised coplanar pedestal portions attached to said pad, distributed over substantially the entire area of said pad covered by said record during said treatment, said portions being separated from each other so as to form interconnected channels therebetween.

21. Apparatus as in claim 20 wherein said material is a thermoplastic rubber with a textured upper surface.

22. Apparatus as in claim 21 wherein said thermoplastic rubber is a butadiene-styrene copolymer.

23. Apparatus for positioning a phonograph record at a stationary location during treatment with a fluid without damaging said record and without contaminating the area surrounding said stationary location with said fluid, said apparatus comprising:
a base pad having dimensions larger than the dimensions of the largest record to be held stationary at said location, said pad being made of a nonconductive, nonabrasive material so that any static electrical charge developing on said pad will be retained to attract and retain foreign objects from the surface of said record;
means for preventing said fluid used in said treatment from flowing off of said pad;
support means for preventing the lower surface of said record from resting in said fluid that may flow off of said record during said treatment, said support means including a plurality of raised coplanar pedestal portions attached to said pad, distributed over substantially the entire area of said pad covered by said record during said treatment, said portions being separated from each other so as to form interconnected channels therebetween; and
friction means for preventing said record from sliding or rotating on said pad during said treatment.

24. Apparatus for positioning a phonograph record at a stationary location during treatment with a fluid without damaging said record and without contaminating the area surrounding said stationary location with said fluid, said apparatus comprising:
a base pad having dimensions larger than the dimensions of the largest record to be held at said stationary location, said pad being made of a nonabrasive material;
means for preventing said fluid used in said treatment from flowing off of said pad;
support means for preventing the lower surface of said record from resting in said fluid that may flow off of said record during said treatment, said support means including a plurality of raised coplanar pedestal portions attached to said pad, distributed over substantially the entire area of said pad covered by said record during said treatment, said portions being separated from each other so as to form interconnected channels therebetween; and means for engaging the centering hole of said record for preventing said record from sliding on said pad during said treatment.

25. Apparatus as in claim 24 wherein said means for engaging is a central protrusion from said pad composed of the same material as said pad.

26. Apparatus for positioning a phonograph record at a stationary location during treatment with a fluid without damaging said record and without contaminating the area surrounding said stationary location with said fluid, said apparatus comprising:

a base pad having dimensions larger than the dimensions of the largest record to be held at said stationary location, said pad being made of a nonconductive, nonabrasive material so that any static electrical charge developing on said pad will be retained to attract foreign objects from the surface of said record;

means for preventing said fluid used in said treatment from flowing off of said pad;

support means for preventing the lower surface of said record from resting in said fluid that may flow off of said record during treatment, said support means including a plurality of raised coplanar pedestal portions attached to said pad, distributed over substantially the entire area of said pad covered by said record during said treatment, said portions being separated from each other so as to form interconnected channels therebetween;

friction means for preventing said record from sliding or rotating on said pad during said treatment; and means for engaging the centering hole of said record for preventing said record from sliding on said pad during said treatment.

27. Apparatus for positioning a phonograph record at a stationary location during treatment with a fluid without damaging said record, said apparatus comprising:

a base pad having dimensions larger than the dimensions of the largest record to be held stationary at said location, said pad being composed of a nonabrasive material;

friction means for preventing said record from sliding or rotating during said treatment;

means for prohibiting said record from sliding off of said pad; and support means for preventing the lower surface of said record from resting in said fluid that may flow off of said record during said treatment, said support means including a plurality of raised coplanar pedestal portions attached to said pad, distributed substantially the entire area of said pad covered by said record during said treatment, said portions being separated from each other so as to form interconnected channels therebetween.

28. Apparatus as in claim 27 wherein said means for prohibiting comprises a raised lip around at least a portion of the periphery of said pad of a height at least the height of said friction means.

29. Apparatus for positioning a phonograph record at a stationary location during treatment with a fluid without contaminating the area surrounding said stationary location with said fluid, said apparatus comprising:

a base pad having dimensions larger than the dimensions of the largest record to be held stationary, said pad being made of a nonabrasive material;

containing means for preventing said fluid used in said treatment from flowing off of said pad;

support means for preventing the lower surface of said record from resting in said fluid that may flow off of said record during said treatment, said support means including a plurality of raised coplanar pedestal portions attached to said pad, distributed over substantially the entire area of said pad covered by said record during said treatment, said portions being separated from each other so as to form interconnected channels therebetween; and means for prohibiting said record from sliding off of said pad.

30. Apparatus as in claim 29 wherein said containing means and said means for prohibiting comprise a raised lip around the periphery of said pad having a height at least the height of said support means and said friction means.

31. Apparatus for positioning a phonograph record at a stationary location during treatment with a fluid without damaging said record, said apparatus comprising:

a base pad having dimensions larger than the dimensions of the largest record to be held at said stationary location, said pad being made of a nonconductive, nonabrasive material;

support means for preventing the lower surface of said record from resting in said fluid that may flow off of said record during said treatment, said support means including a plurality of raised coplanar pedestal portions attached to said pad distributed over substantially the entire area of said pad covered by said record during said treatment, said portions having a surface with a high coefficient of friction, and said portions being separated from each other so as to form interconnected channels therebetween; and a continuous raised lip around the periphery of said pad of a height less than the height of said portions.

32. Apparatus as in claim 31 wherein said pad is composed of a thermoplastic rubber.

33. Apparatus as in claim 32 wherein said thermoplastic rubber is a butadiene-styrene copolymer.

34. Apparatus as in claim 31 wherein said portions are composed of the same material as said pad and the upper surface of said portions is roughened.

35. Apparatus as in claim 31 wherein said lip is composed of the same material as said pad.

36. Apparatus for positioning a phonograph record at a stationary location during treatment with a fluid without damaging said record, said apparatus comprising:

a base pad having dimensions larger than the dimensions of the largest record to be held at said stationary location, said pad being made of a nonconductive, nonabrasive rubber-like material;

support means for preventing the lower surface of said record from resting in said fluid that may flow off of said record during said treatment, said support means including a plurality of raised coplanar pedestal portions attached to said pad and distributed over substantially the entire area of said pad covered by said record during said treatment, said portions having a surface with a high coefficient of friction, and said portions being separated from each other so as to form interconnected channels therebetween;

a continuous raised lip around the periphery of said pad of a height less than the height of said portions; and a central protrusion located substantially in the center of said area of said pad covered by said record during said treatment.

37. Apparatus as in claim 36 wherein said central protrusion is composed of the same material as said pad.

38. Apparatus as in claim 36 wherein said roughened surface varies on the order of three thousandths of an inch in depth.

39. Apparatus as in claim 38 wherein said apparatus is entirely composed of a thermoplastic rubber.

40. Apparatus as in claim 39 wherein said thermoplastic rubber is a butadiene-styrene copolymer.

41. Apparatus for positioning a phonograph record at a stationary location during treatment with a fluid without damaging said record, said apparatus comprising:

a base pad having dimensions larger than the dimensions of the largest record to be held at said stationary location, said pad being made of a nonabrasive material;

support means for preventing the lower surface of said record from resting in said fluid that may flow off of said record during said treatment, said support means including a plurality of raised coplanar pedestal portions attached to said pad and distributed over substantially the entire area of said pad covered by said record during said treatment, said portions having a surface with a high coefficient of friction, and said portions being separated from each other so as to form interconnected channels therebetween; and a continuous raised lip around the periphery of said pad of a height at least the height of said portions.

* * * * *